(12) United States Patent
Fowler, II et al.

(10) Patent No.: US 8,381,187 B2
(45) Date of Patent: Feb. 19, 2013

(54) GRAPHICAL USER INTERFACE FOR JOB OUTPUT RETRIEVAL BASED ON ERRORS

(75) Inventors: Melvin Eugene Fowler, II, San Jose, CA (US); Steven K. Ma, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1670 days.

(21) Appl. No.: 11/534,016

(22) Filed: Sep. 21, 2006

(65) Prior Publication Data
US 2008/0079983 A1    Apr. 3, 2008

(51) Int. Cl.
*G06F 9/44* (2006.01)
*G06F 11/00* (2006.01)
*G06F 3/048* (2006.01)

(52) U.S. Cl. ........ 717/125; 717/124; 714/38.1; 715/833
(58) Field of Classification Search .......... 717/124–135; 714/37, 38, 47–57, 38.1, 47.1–57; 715/833, 715/974
See application file for complete search history.

(56) References Cited

U.S. PATENT DOCUMENTS

| | | | |
|---|---|---|---|
| 5,321,835 A * | 6/1994 | Tanaka et al. ................. | 718/101 |
| 5,375,199 A * | 12/1994 | Harrow et al. ................. | 715/771 |
| 5,442,740 A | 8/1995 | Parikh | |
| 5,850,531 A * | 12/1998 | Cox et al. ....................... | 715/781 |
| 5,862,381 A | 1/1999 | Advani et al. | |
| 5,898,873 A | 4/1999 | Lehr | |
| 6,041,425 A * | 3/2000 | Kokunishi et al. ............... | 714/37 |
| 6,216,143 B1 | 4/2001 | Ryan et al. | |
| 6,282,701 B1 | 8/2001 | Wygodny et al. | |
| 6,332,212 B1 | 12/2001 | Organ et al. | |
| 6,448,985 B1 * | 9/2002 | McNally ........................ | 715/784 |
| 6,611,276 B1 * | 8/2003 | Muratori et al. ............... | 715/772 |
| 6,990,636 B2 * | 1/2006 | Beauchamp et al. .......... | 715/764 |
| 7,058,666 B1 * | 6/2006 | Li et al. ................................. | 1/1 |
| 7,100,094 B2 * | 8/2006 | Babutzka et al. ............... | 714/48 |
| 7,216,116 B1 * | 5/2007 | Nilsson et al. .......................... | 1/1 |
| 7,310,777 B2 * | 12/2007 | Cirne ............................ | 715/763 |
| 2003/0126585 A1 * | 7/2003 | Parry ............................ | 717/124 |
| 2003/0197733 A1 * | 10/2003 | Beauchamp et al. .......... | 345/764 |
| 2004/0075690 A1 * | 4/2004 | Cirne ............................ | 345/771 |
| 2004/0128651 A1 * | 7/2004 | Lau ............................... | 717/124 |
| 2005/0132337 A1 | 6/2005 | Wedel et al. | |

FOREIGN PATENT DOCUMENTS

JP    7261744    10/1995

OTHER PUBLICATIONS

"Working with the Trace Viewer", Wisconsin Package SeqLab Guide, pp. 1-10. http://iccbnet.ibp.cz/gcg_pdf/seqlab/03-working_with_trace_viewer.pdf, retrieved Jan. 25, 2006.
"Remote Job Monitor—IBM WebSphere Developer v6.0.1", IBM Corporation, Dec. 2005, pp. 1-2.(document contained in development plugin Wd/z 6.0.1 that is shipped with the product).

* cited by examiner

*Primary Examiner* — Wei Zhen
*Assistant Examiner* — Qing Chen
(74) *Attorney, Agent, or Firm* — Yee & Associates, P.C.; Prentiss W. Johnson

(57) ABSTRACT

A computer implemented method, apparatus, and computer usable program code for retrieving portions of a job output. A graphical representation of the job output is displayed in a graphical user interface. The graphical user interface contains a set of controls used to select a portion of the job output. The portion of the job output is displayed in response to a user manipulating the set of controls to select the portion of the job output.

23 Claims, 8 Drawing Sheets

*FIG. 3B*
*(PRIOR ART)*

```
┌─ Session A - (24 x 80) ─────────────────────────────────────────┐ □ x
 File  Edit  View  Communication  Actions  Window  Help
 [toolbar icons]

Display   Filter   View   Print   Options   Help
  ─────────────────────────────────────────────────────────────
  SDSF OUTPUT DISPLAY GEN001         J0055378   DSID     2 LINE 0      COLUMNS 02- 81
  COMMAND INPUT ===>                                           SCROLL ===> PAGE
  ********************************* TOP OF DATA *********************************
                        J E S 2   J O B   L O G  --  S Y S T E M   S Y 4 B  --  N O D E
  17.50.39 J0055378  ---- THURSDAY, 10 NOV 2005 ----
  17.50.39 J0055378  IRR010I  USERID MASTEVE   IS ASSIGNED TO THIS JOB.
  17.50.39 J0055378  ICH70001I MASTEVE  LAST ACCESS AT 17:47:19 ON THURSDAY, NOVEMBER
  17.50.39 J0055378  $HASP373 GEN001  STARTED - WLM INIT - SRVCLASS BATCH_M  - S
  17.50.39 J0055378  ACTCC01I GEN001  STEP:COBOL   PROC:STP0000  NOT EXECUTED
  17.50.39 J0055378  IEF453I GEN001 - JOB FAILED - JCL ERROR
  17.50.39 J0055378  $HASP395 GEN001  ENDED
  ---- JES2 JOB STATISTICS ----
  10 NOV 2005 JOB EXECUTION DATE
            14 CARDS READ
           148 SYSOUT PRINT RECORDS
             0 SYSOUT PUNCH RECORDS
            10 SYSOUT SPOOL KBYTES
          0.01 MINUTES EXECUTION TIME
     1 //GEN001 JOB (MASTEVE,F43,090,J63A),'STEVEN.MA', F1=HELP    F2=SPLIT   F3=END     F4=RETURN   F5=IFIND    F6=BOOK
  F7=UP      F8=DOWN    F9=SWAP    F10=LEFT    F11=RIGHT   F12=RETRIEVE
  MA                                                               04/021
 ─────────────────────────────────────────────────────────────
 [□] Connected to remote server/host stlplex4b.svl.ibm.com using fu/pool ST
```

← 304

← 306

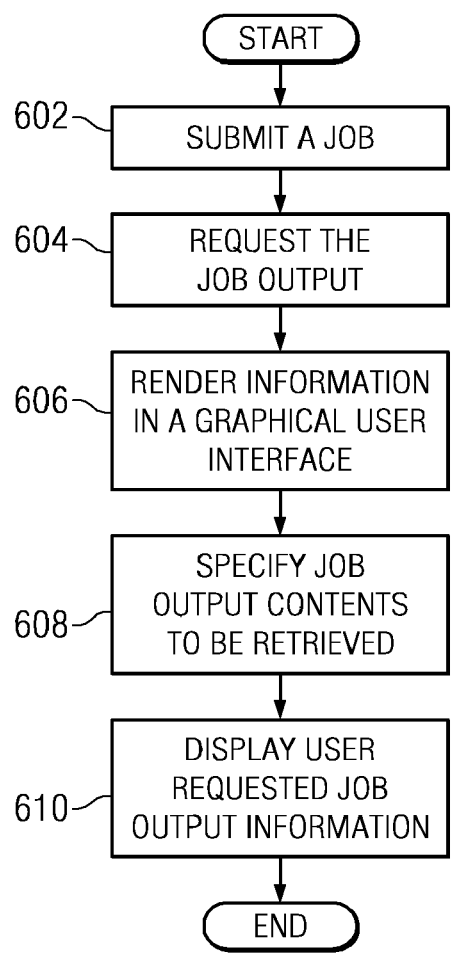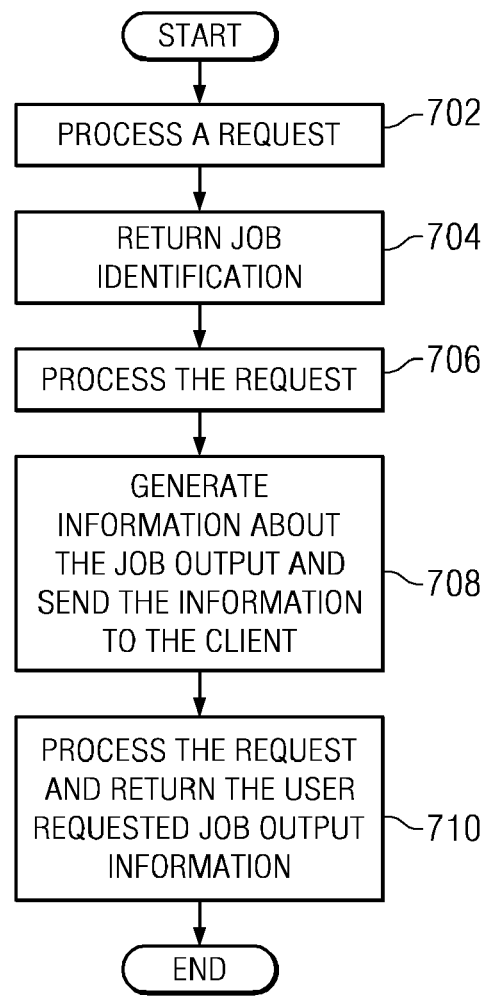

GRAPHICAL USER INTERFACE FOR JOB OUTPUT RETRIEVAL BASED ON ERRORS

BACKGROUND OF THE INVENTION

1. Field of the Invention

The present invention relates generally to improved data processing, and more particularly to a method and apparatus for displaying a graphical user interface for job output retrieval. Still more particularly, the present invention provides a computer implemented method, apparatus, and computer usable program code for displaying portions of a job output based on errors.

2. Description of the Related Art

Data processing systems are used by increasing numbers of businesses and individuals each year. These data processing systems help users to efficiently process data and information. To a large extent, the efficiency of the data processing system relies on processing various jobs to process data and information. A job is a separately executable unit of work defined by a user, and run by a computer. Operating systems such as z/OS from International Business Machines, have batch jobs written in job control language (JCL). The batch jobs are submitted to execute batches of commands. For example, jobs are often used for compiling programs and building applications. Jobs are submitted to be processed on the host by a job subsystem, such as a job entry system (JES). After processing, the job subsystem writes the job output to data sets. A user may then open the data sets to find out if the submitted job has run to completion and to determine if each step in the job submitted was run successfully.

For some of the more complex jobs, outputs in the data sets may reach hundreds of thousands lines. As a result, retrieving and viewing the full data set output may be undesirable because the time to open such a large file would be substantial. Additionally, the time it takes for a user to scan the large volume text file and locate the error(s) in the output data is proportional to the size of the output. In other words, the larger the output file, the longer it will take for a user to find the desired information.

Most users are interested in examining the job output when the job did not run to completion or if the job ran to completion but incurred errors or warnings during the process. In both cases, the "troubleshooting" information useful to the user is only a very small subset of the overall output data set. Most job management tools allow a user to specify the portion of the job output to retrieve. Additionally, the user may also specify the lines of the output to view by typing a locate command. Such a command displays the output from the specified line to the end of the output or lines in a range.

While both of these approaches provide the user a mechanism to reduce the size of the output, both lack any support to help the user determine what line number to enter. Such job management tools are only effective if the lines in which the errors are displayed are always the same and/or the user is an experienced user with the submitted job and has sufficient familiarity to anticipate which line(s) the error(s) appear on.

As a result, most of the time the job management tool does not effectively help the user troubleshoot the job. Because a job can have multiple steps and each step can be of variable length, the locations of errors can vary from job to job. As a result, the location of the error in the output data set is quite unpredictable. While expertise and familiarity with the jobs can help a user better anticipate where the errors might be, guessing the location of the errors is typically error prone, especially for users with limited experience.

SUMMARY OF THE INVENTION

The aspects of the present invention provide a computer implemented method, apparatus, and computer usable program code for retrieving portions of a job output. A graphical representation of the job output is displayed in a graphical user interface. The graphical user interface contains a set of controls used to select a portion of the job output. The portion of the job output is displayed in response to a user manipulating the set of controls to select the portion of the job output.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A-3D are screen shots of currently used solutions for job output retrieval;

FIG. 6 is a flowchart showing user interaction for job output retrieval in accordance with an illustrative embodiment of the present invention; and FIG. 7 is a flowchart illustrating job output retrieval in accordance with an illustrative embodiment of the present invention.

DETAILED DESCRIPTION OF THE PREFERRED EMBODIMENT

Figure 1:
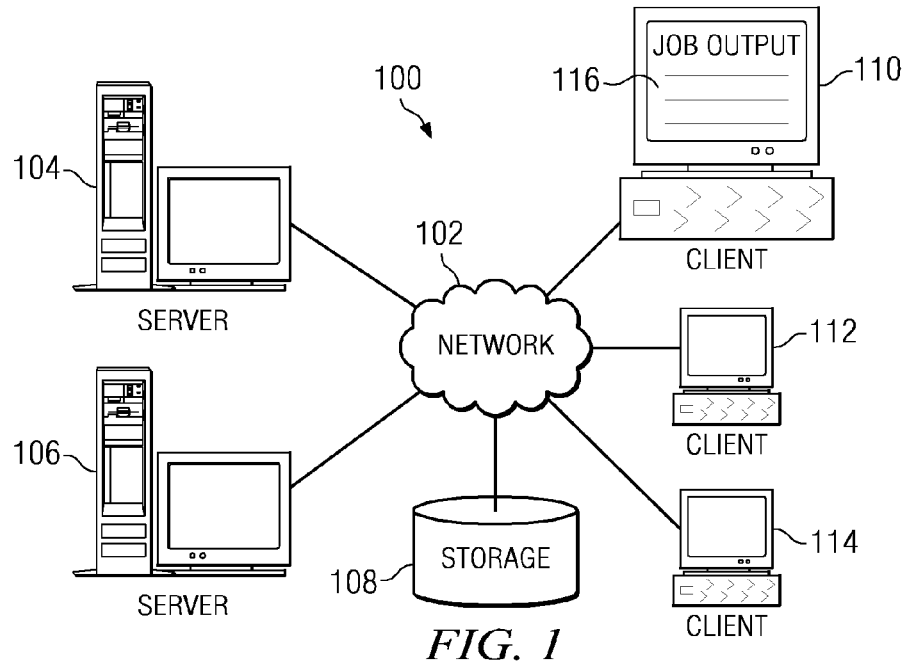
FIG. 1 is pictorial representation of a data processing system in which the aspects of the present invention may be implemented.
Figure 2:
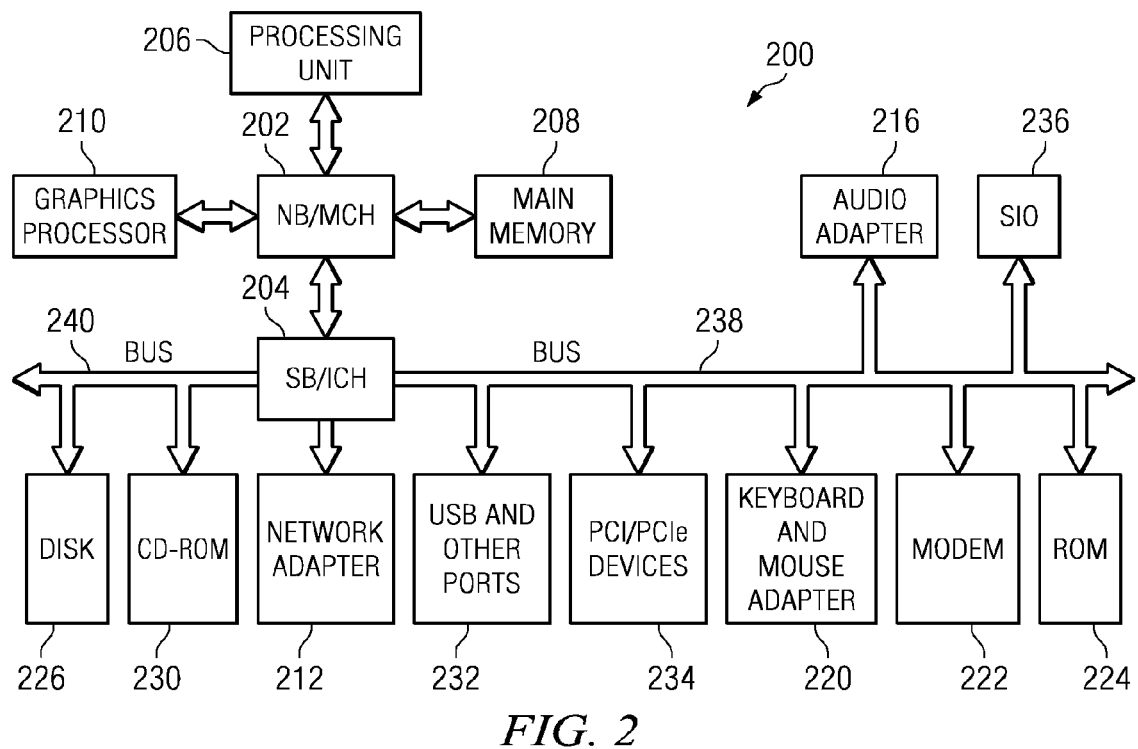
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of so-called graphical user interface (GUI) 116 to provide an intuitive and graphical interface between the user, such as client 114 and the data processing system. Graphical user interface 116 is an interface system, including devices by which a user interacts with a system, system components, and/or system applications via windows or view ports, icons, menus, pointing devices, electronic pens, touch screens, and other input devices. Information may be both input and viewed by an administrative user and individual users using graphical user interface 116.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA. The methods of the present invention may be performed in a data processing system, such as data processing system 100 shown in FIG. 1 or data processing system 200 shown in FIG. 2.

Figure 3A:
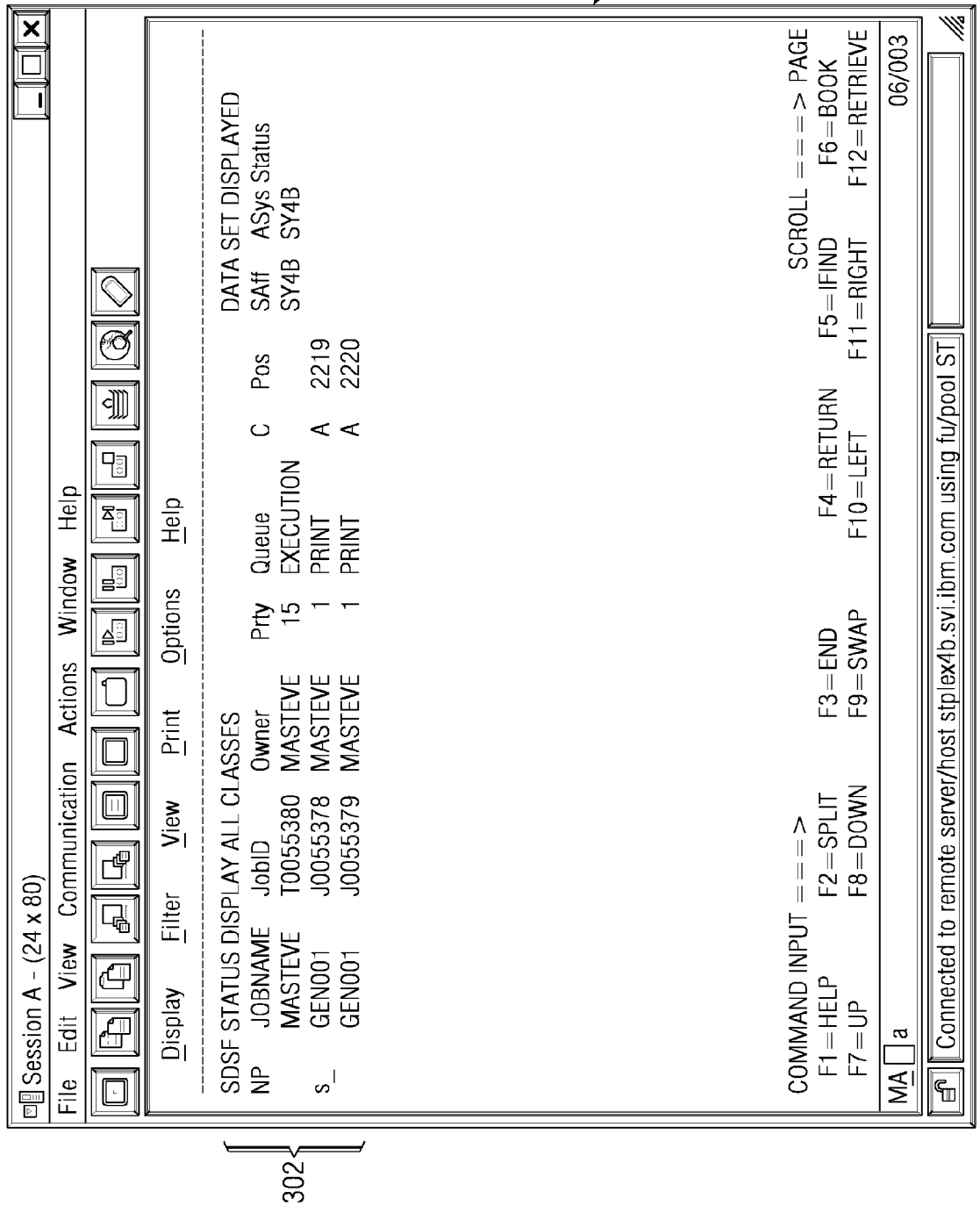

FIGS. 3A-3D are screen shots of currently used solutions for job output retrieval. The state of the art solution for job output retrieval may be an Interactive System Productivity Facility (ISPF) based solutions such as job entry system. In FIG. 3A, window 300 shows a system display and search panel for job output retrieval. For example, when retrieving the output, a user types "s" as shown in section 302.

FIG. 3B illustrates how the output is displayed a page at a time to the user in window 304. For example, in window 304, the first seventeen lines of the job output are displayed in section 306. Because a limited number of lines can be displayed at once, a user must scroll up and down pages of job output while trying to locate the critical information.

Figure 3C:
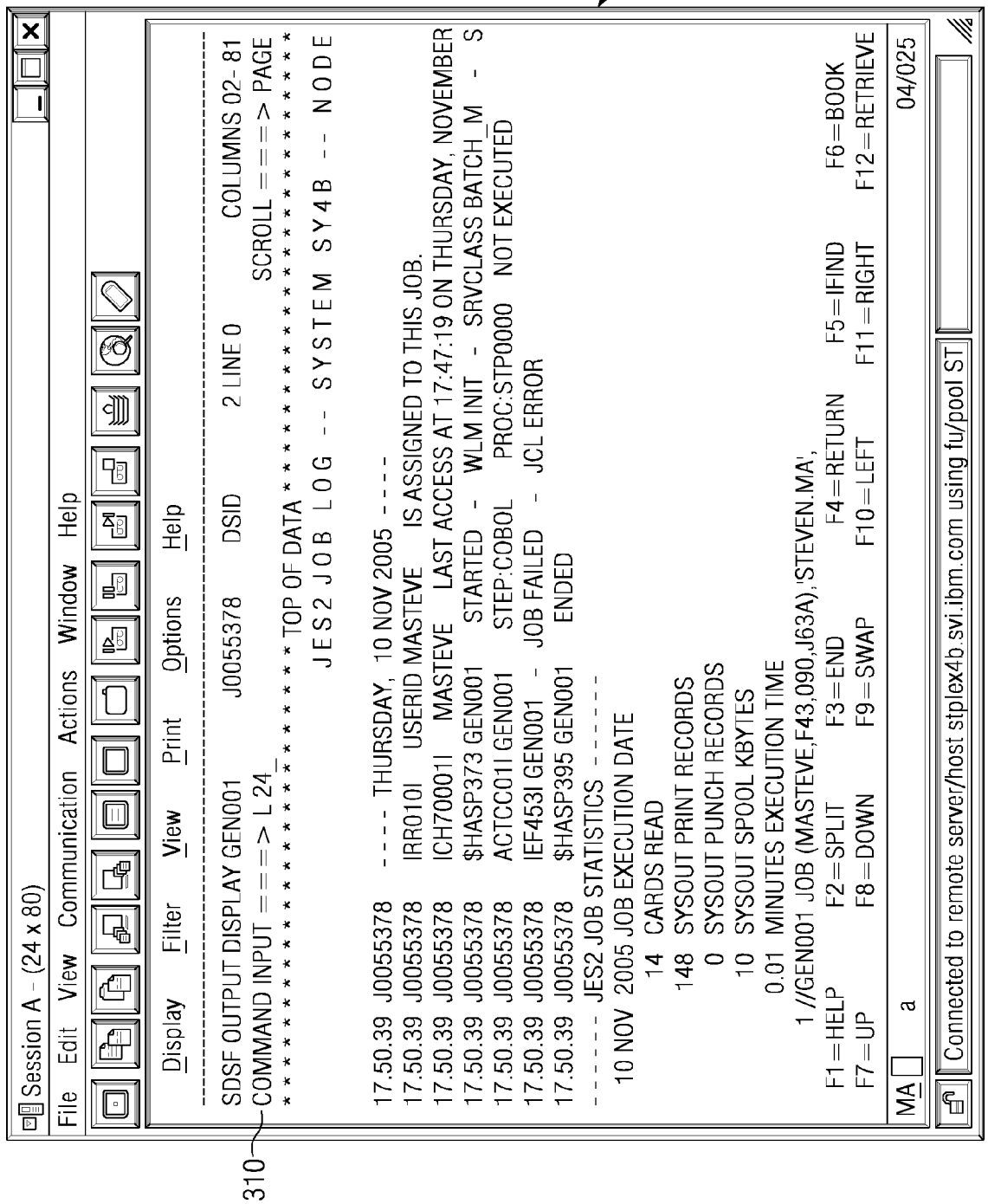

FIG. 3C illustrates features available for advanced users. For example, in window 308, the user may specify the line number to locate by typing "L" and the line number in command line 310. In window 308, the user types "L 24" in command line 310 to locate line 24 and retrieve output from line 24 and onward.

Figure 3D:
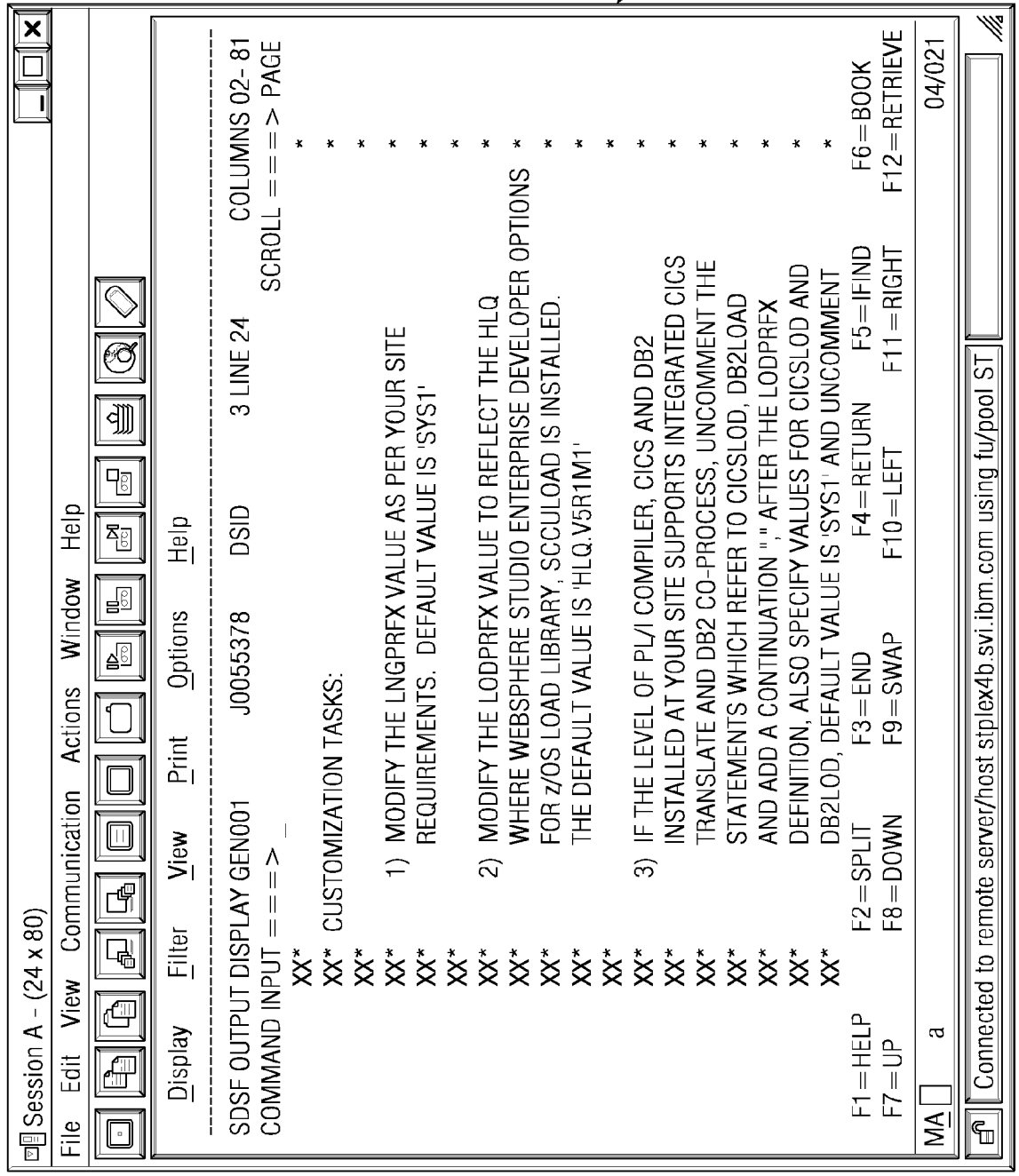

FIG. 3D illustrates how line 24 onward is displayed in section 312 of window 314 in response to the command entered on command line 310 in FIG. 3C. The existing solution allows a user to retrieve job output but does not provide much information to help users efficiently locate the lines of the job output that contain critical information or return code most useful to a user. As a result, the user must guess or analyze all of the job output.

Aspects of the present invention provide a computer implemented method, apparatus, and computer usable program code for displaying portions of a job output based on errors. The job output is the file, data set, text, or other output written to a file by a job subsystem after a job has been processed. A graphical user interface displays errors in the job output. The user may select which portions of the job output to view using the graphical user interface.

Figure 4:
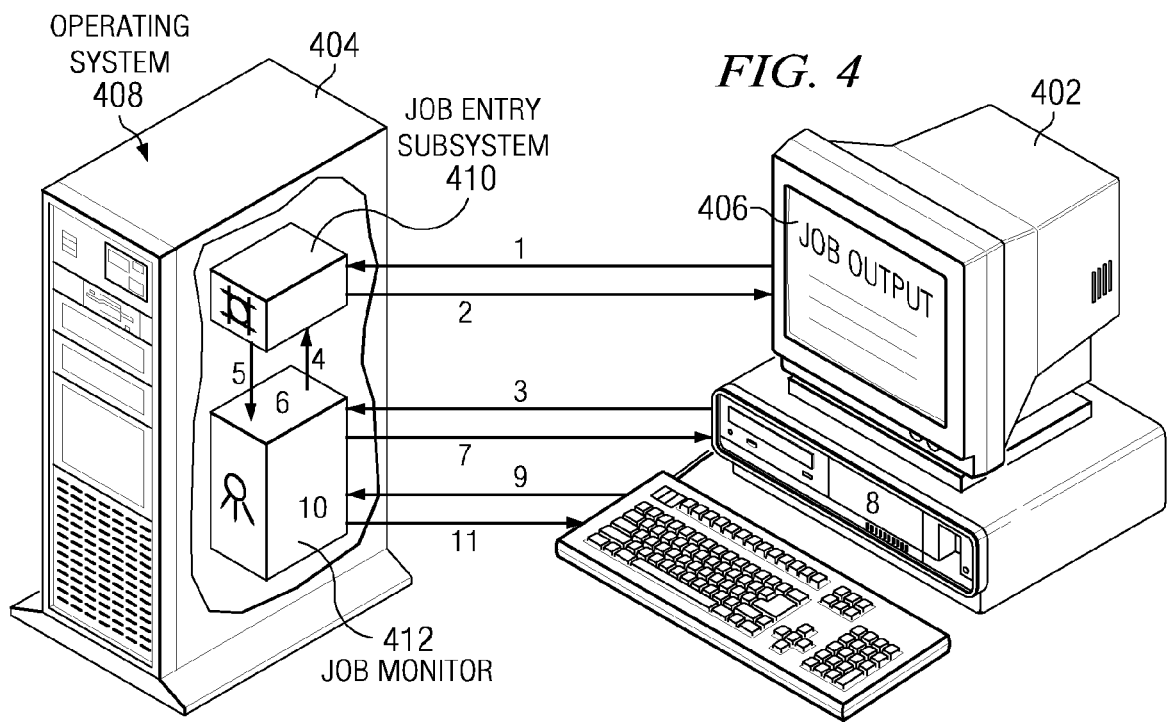
FIG. 4 is a flow diagram for presenting a client with job output information in accordance with an illustrative embodiment of the present invention.

FIG. 4 is a flow diagram for presenting a client with job output information in accordance with an illustrative embodiment of the present invention. Client 402 is a networked data processing system, such as client 110 of FIG. 1. Job monitor server 404 is a host server, such as server 106 of FIG. 1. Client 402 and Job monitor server 404 are operably connected by a network, such as network 102 of FIG. 1.

Client 402 includes graphical user interface 406 used to enter information and selections and display job output information. Job monitor server 404 includes operating system 408. Operating system 408 may be stored, accessed, and processed by components, such as disk drive 226, main memory 208, and processor 206 of FIG. 2. For example, operating system 408 may be the IBM z/OS, which is available from International Business Machines Corporation.

Operating system 408 includes various components that may be used to process jobs and job output information including Job Entry Subsystem (JES) 410 and lob monitor 412. Operating system 408 uses job entry subsystem 410 to receive jobs into the operating system, schedule the jobs for processing, and to control the job output processing. Job monitor 412 processes and analyzes the job output file for client 402.

Job monitor 412 functions as a job control language parser on operating system 408. Job Monitor 412 parses the job output to determine the total size of the output file and the location of errors in the job output if there are any. While parsing the job output, job monitor 412 marks errors with return code that is larger than zero registering the line number corresponding to the error. The modified job output is used to populate graphical user interface 406.

Once a user has used graphical user interface 406 to select portions of job output to view, client 402 sends the request to job monitor server 404. The requested output is retrieved by Job Monitor 412 and sent to client 402 for display on graphical user interface 406.

Client 402 submits a job (step 1). Job monitor server 404 receives the job, and Job entry subsystem 410 returns a job identification number identifying the job (step 2). Client 402 requests the job output (step 3). Job monitor 412 receives the request for the job output and requests the job output file from job entry subsystem 410 (step 4). Job entry subsystem 410 returns the job output file to job monitor 412 in response to the request (step 5). Job monitor 412 extracts information about the job output file such as file size, error location, and error severity (step 6). Job monitor 412 returns the job output information to client 402 (step 7). Client 402 renders data to populate portions of graphical user interface 406, and the user selects to view portion(s) of the job output (step 8). The user uses client 402 to request portions of the job output file (step 9). Job monitor 412 receives the request and processes the request (step 10). Job monitor 412 returns the user-requested job output to client for display on graphical user interface 406 (step 11).

Figure 5A:
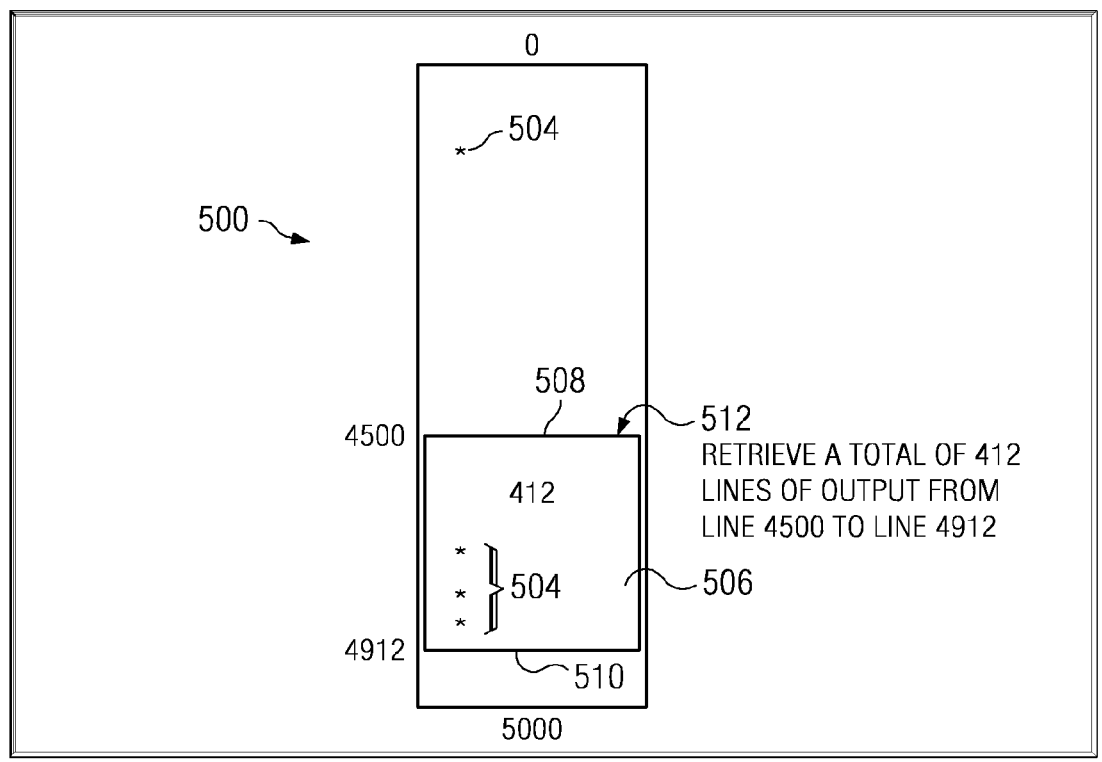
FIGS. 5A-5C are examples of a graphical user interface for job output retrieval in accordance with an illustrative embodiment of the present invention.
Figure 5B:
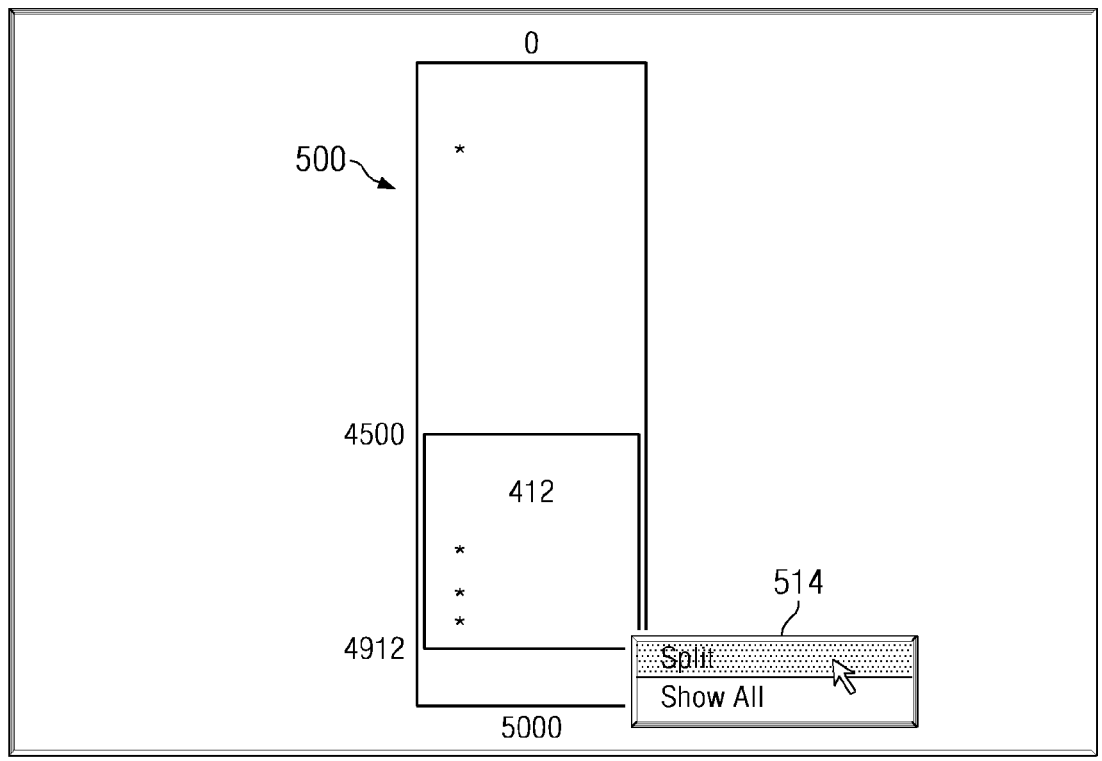
Figure 5C:
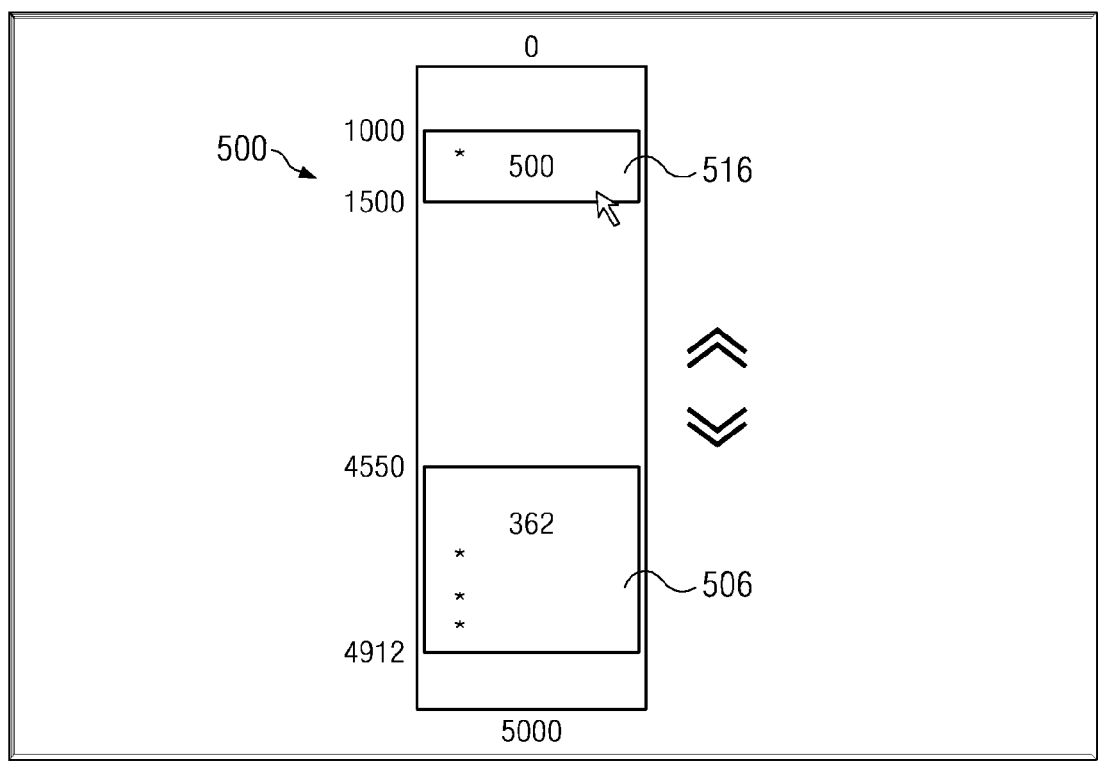

FIGS. 5A-5C are examples of a graphical user interface for job output retrieval in accordance with an illustrative embodiment of the present invention. Graphical user interface 500 may be displayed on a user interface of a client device, such as graphical user interface 406 of client 402 in FIG. 4. For example, in FIG. 5A, job output information may be displayed to a user on graphical user interface 500. Graphical user interface 500 displays job output information for allowing the user to select which portions of the job output to view for troubleshooting purposes.

In one illustrative embodiment, graphical user interface 500 may include line bar 502. Line bar 502 is a graphical representation of the job output and specifically shows how many lines are included in the job output. For example, the job output may include 5000 lines which are represented by line bar 502. Errors 504 may be graphically represented in line bar 502 corresponding to the location of errors 504 in the job output. In the examples of FIGS. 5A-5C, errors 504 are shown as asterisks.

User may use slider 506 to specify which portion and how many lines of the job output to retrieve. Slider 506 includes lower range 508 and upper range 510. Lower range 508 specifies the first line of job output to be displayed. Upper range 510 specifies the last line of job output to be displayed. In FIG. 5A, lower range 508 is specified as line 4500, and upper range 510 is specified as line 4912. Slider 506 may also display the number of lines encompassed within lower range 508 to upper range 510. For example, the number of lines to be retrieved in this example is 412.

Graphical user interface 500 includes a set of controls. The set of controls are one or more controls and may include line bar 502 and elements of slider 506. User selections may be made using the set of controls using a mouse. For example, the user may select a range of lines to view by expanding slider 506 using a right mouse click.

By adjusting slider 506 and lower range 508 and upper range 510, the user may specify which portions of the job output should be displayed. Slider 506 is especially useful because it may be increased or decreased according to errors 504. In one example, the user may only select to view five lines of the job output. In another example, the user may select to view hundreds of lines of the job output before and after errors 504.

Graphical user interface 500 may also preview summary 512 of the portions of the job output to be retrieved. The information of summary 512 is displayed in real-time as the user manipulates slider 506. For example, summary 512 may show how many lines the user has requested to display as well as lower range 508 and upper range 510.

Slider 506 may include an intelligent default for facilitating job output review. Because the number of errors 504 as well as the location of errors 504 are known before graphical user interface 500 is populated, slider 506 may be set to encompass the known errors 504. As a result, when graphical user interface 500 is displayed, slider 506 may be set to encompass all errors 504. Such a default setting automatically adjust the size of slider 506 which may minimizes the time and effort needed to select which portions of the job output to review. The user may also specify how many lines before and after the first and last errors should be encompassed by lower range 508 and upper range 510.

The user may further specify graphical user interface preferences. Displayed errors 504 may be color coded. The color of each error may correspond to the severity of the error. For example, a user may specify that all the errors with return code greater than eight be shown in red symbolizing a severe error. Additionally, errors with return code between four and eight may be shown in yellow. As a result, the user may more effectively use graphical user interface 500 to determine which portions of the job output to review.

The user may also set preferences specifying selective error display based on severity. For example, graphical user interface 500 may be configured such that only errors 504 with return code above a threshold or specified severity level are shown. For instance, the user may set the preferences to only show errors 504 with a return code greater than four. Setting selective error display preferences may allow a user to focus on the most critical errors of the job output. Additionally, selective error display may be particularly useful to a user expecting a large number of errors 504 in the output when the user does not care to view all errors 504 at the moment.

In one embodiment, return code (RC) is the indicator of warnings and errors 504. In another embodiment, the user may specify any number of indicators that may be used by a job monitor, such as job monitor 412 of FIG. 4. For example, the user may specify a string such that during job control language parsing, the job monitor will search for a particular string inside the job output and display the location of that string on graphical user interface 500 for selective retrieval. Examples of strings used for parsing may include, CEE* LE error messages, DFH* DB2 error messages, IBM* PL/I error messages, IGY* COBOL error messages, and FAA* CICS error messages.

Graphical user interface 500 may use a variety of different formats and methods of user interaction. Each different method may allow the user to both view job output errors and select which portions of the job output to view. For example, graphical user interface 500 may include a check box viewer. The check box viewer may break the job output up into groups by checking a box. For example, by selecting a box the user may select to view 100 lines of the job output. As a result, the user may use the check box viewer to locate errors and select portions of the job output to view by selecting check boxes corresponding to the errors.

In another example, graphical user interface 500 may include a free form selection mechanism. The free form selection mechanism may allow a user to select an area of interest within the job output by dragging and dropping a rectangular box.

In another example, graphical user interface 400 may include a direct selection mechanism. Each error may be represented by a check box for the user to select. The user may establish preferences to show just the line with errors or a specified number of lines before and after the error. For example, if the user selected a check box representing line number 25, the direct select interface may display, by default, the 5 lines before and 5 lines after line 25.

FIG. 5B illustrates other possible features of graphical user interface 500 that further enhance capability and usability for the user. For example, the user may use context menu 514 to specify other options. One option may allow the user to simply select the "show all" command via context menu 514. Selecting show all in context menu 514 maximizes slider 506 to allow for retrieval of the full job output.

The user may also select to "split" slider 506 into multiple sliders. FIG. 5C illustrates slider 506 split into slider 506 and second slider 516. By splitting into slider 506 and second slider 516, the user is able to further optimize the size and portions of the job output to retrieve. In this example, the user initiates a split by using context menu 514 on graphical user interface 500. Once slider 506 is split into two, the user is able to specify the output retrieval of two different groups of errors 504. Separate sliders are useful when errors 504 occurred in two job steps that are not necessarily close to each other. For example, in a job that has ten steps, Step 1 and Step 10 have errors but not Step 2-9. In this case, the split function allows a user to retrieve errors from Step 1 using second slider 516 and step 10 using slider 506 but not outputs from Step 2-9.

To undo the splitting, the user may simply move or drag one slider onto another, and as a result slider 506 and second slider 516 will join into one slider 506. Depending on the size of the job output, slider 506 may be split into any number of sliders.

FIG. 6 is a flowchart showing user interaction for job output retrieval in accordance with an illustrative embodiment of the present invention. The process may be implemented by a user on a client data processing system, such as client 402 of FIG. 4. The user may enter and receive information using a graphical user interface, such as graphical user interface 406 of FIG. 4 and graphical user interface 500 of FIG. 5.

The process begins as the user submits a job (step 602). Some time later after the job has been processed, the user requests the job output (step 604). The request in step 604 is a general request initiating the job retrieval process. The client renders information about the job output in a graphical display (step 606). The information is rendered based on job output information from the user. Next, the user specifies job output contents to be retrieved (step 608). A bar graphic, such as line bar 502 of FIG. 5 may be used to display the lines and errors of the job output to the user. The user may use a slider, such as slider 506 to specify which lines of the job output to retrieve (step 608). Next, the client displays the user request job output information (step 610).

FIG. 7 is a flowchart illustrating job output retrieval in accordance with an illustrative embodiment of the present invention. The process of FIG. 7 may be implemented by a host server, such as job monitor server 404 of FIG. 4. Specifically, the process of FIG. 7 may be implemented by an operating system, such as operating system 408 of FIG. 4 using job processing components, such as job entry subsystem 410 and job monitor 412.

The process begins by processing a request (step 702). The request may be received from a client, such as client 402 of FIG. 4 as submitted by a user in a step, such as step 602 of FIG. 6. Next, the process returns the job identification (step 704). In response to receiving a request for a job output in a step, such as step 604 of FIG. 6, the process processes the request (step 706). Next, the process generates information about the job output and sends the information to the client (step 708). In step 708, the job output information may be passed to a client, such as client 402 of FIG. 4.

In response to receiving a user specified job output to be retrieved in a step, such as step 608 of FIG. 6, the process processes the request and returns the user requested job output information (step 710) with the process terminating thereafter. The requested job output information allows the user to view the requested job output information for evaluation, analysis, and troubleshooting the submitted job.

Steps 702 and 704 may be implemented by job entry subsystem, such as job entry subsystem 410 of FIG. 4. Steps 706-710 may be implemented by a job monitor such as job monitor 412 of FIG. 4.

Thus, the aspects of present invention takes advantage of the power of human perception through a graphical user interface that delivers rich information content and allow for intuitive user interaction. The graphical user interface minimizes the cognitive burden on a user allowing the user to efficiently see the number of errors, location with respect to each other, and the job output. As a result, the user does not have to guess which portions of the job output should be reviewed. The improvement in ease of use makes it easy for even inexperienced users to locate portions of a job output for troubleshooting that normally requires a much higher level of "know-how" expertise. By specifying only the area(s) of the output to be retrieved rather than the whole output, performance of job output retrieval is improved.

The graphical user interface shortens the amount of time between a user job output request and viewing the selected job. Instead of downloading the whole job output, the client now only needs to download portion of the output. The smaller physical size of the downloaded file results in a shorter time to render and display the textual information. Additionally, cognitive human performance is also improved because the user may more effectively process the smaller amount of data.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium storing computer usable program code for retrieving portions of a job output, said computer program product including:
   computer usable program code for displaying a graphical representation of lines of the job output in a graphical user interface, wherein the graphical representation of lines of the job output is a graphical summary that represents a plurality of lines of the job output without displaying an individual line of the job output, wherein the graphical user interface includes a set of controls used to select a portion of the job output by selecting a range of lines from the graphical representation of lines of the job output, wherein the set of controls is manipulated by a user to specify a lower range and an upper range of the range of lines from the graphical representation of lines of the job output, and wherein the lower range is different than the upper range;
   computer usable program code, responsive to the user manipulating the set of controls to select the portion of the job output, for displaying the portion of the job output, wherein the portion of the job output includes lines of job output corresponding to the selected range of lines from the graphical representation of lines of the job output; and
   computer usable program code for displaying errors in the graphical representation of lines of the job output.

2. The computer program product of claim 1, wherein the computer usable program code for displaying the graphical representation of lines of the job output further comprises:
   computer usable program code for requesting the portion of the job output and then displaying a graphical representation of the portion of the job output when the portion of the job output is received.

3. The computer program product of claim 2, wherein the portion of the job output is a plurality of non-contiguous sections in the job output as specified by the user using the set of controls.

4. The computer program product of claim 3, further comprising:
   computer usable program code for splitting a slider into multiple sliders for selecting the plurality of non-contiguous sections in the job output for display to the user.

5. The computer program product of claim 1, wherein the computer usable program code for displaying the graphical representation of lines of the job output further comprises:

computer usable program code for displaying the job output in the graphical user interface, wherein the graphical user interface shows a total number of lines in the job output, errors in the job output, and the portion of the job output to display in a user-specified job output.

6. The computer program product of claim 1, further comprising:
computer usable program code, responsive to receiving a request for the job output, for extracting job output information about the job output for displaying the graphical representation of lines of the job output in the graphical user interface.

7. The computer program product of claim 1, wherein the computer usable program code for displaying the graphical representation of lines of the job output and computer usable program code for displaying the portion of the job output are performed by a client.

8. The computer program product of claim 1, further comprising:
computer usable program code for extracting information about the job output including file size, error location, and error severity.

9. The computer program product of claim 1, wherein the set of controls include any of a line bar, slider, lower range, and upper range.

10. The computer program product of claim 1, further comprising:
computer usable program code for allowing the user to slidably select the portion of the job output.

11. The computer program product of claim 1, wherein the errors are color coded according to severity.

12. The computer program product of claim 1, further comprising:
computer usable program code for allowing the user to select the portion of the job output using a free form selection mechanism.

13. The computer program product of claim 1, further comprising:
computer usable program code for allowing the user to select a plurality of check boxes, wherein each of the plurality of check boxes corresponds to one of a plurality of portions of the job output.

14. A job output retrieval system comprising:
a host server, wherein the host server includes an operating system, and wherein the operating system includes a job entry subsystem and a job monitor; and
a client operably connected to the host server, wherein the client displays a graphical user interface for job retrieval;
wherein the client submits a request for job output information to the host server, the job monitor returns the job output information to the client, the client renders a graphical representation of lines of the job output information to the graphical user interface for allowing a user to specify a portion of the job output information to review by selecting a range of lines from the graphical representation of lines of the job output information, the client sends a request for a specified job output information, the job monitor processes the request for the specified job output information and sends a response for the specified job output information to the client, and the client displays the specified job output information to the user on the graphical user interface, wherein the portion of the job output information includes lines of job output information corresponding to the selected range of lines from the graphical representation of lines of the job output information, wherein errors in the graphical representation of lines of the job output information are displayed, wherein the graphical representation of lines of the job output information is a graphical summary that represents a plurality of lines of the job output information without displaying an individual line of the job output information, wherein the graphical user interface includes a set of controls used to select the portion of the job output information by selecting a range of lines from the graphical representation of lines of the job output information, wherein the set of controls is manipulated by a user to specify a lower range and an upper range of the range of lines from the graphical representation of lines of the job output information, and wherein the lower range is different than the upper range.

15. The job output retrieval system of claim 14, wherein the client submits a job to the host server, wherein the job entry subsystem returns a job identification to the client, and wherein the client requests the job output information from the host server.

16. The job output retrieval system of claim 14, wherein the specified job output information includes the portion of the job output information that the user selects to review.

17. The job output retrieval system of claim 14, wherein the portion of the job output information is a plurality of non-contiguous sections in the job output information as specified by the user using the set of controls.

18. The job output retrieval system of claim 14, wherein the set of controls include any of a line bar, slider, lower range, and upper range.

19. A computer implemented method for retrieving a job output from a job, the computer implemented method comprising:
displaying a graphical representation of lines of the job output in a graphical user interface, wherein the graphical representation of lines of the job output is a graphical summary that represents a plurality of lines of the job output without displaying an individual line of the job output, wherein the graphical user interface includes a set of controls used to select a portion of the job output by selecting a range of lines from the graphical representation of lines of the job output, wherein the set of controls is manipulated by a user to specify a lower range and an upper range of the range of lines from the graphical representation of lines of the job output, and wherein the lower range is different than the upper range;
responsive to the user manipulating the set of controls to select the portion of the job output, displaying the portion of the job output, wherein the portion of the job output includes lines of job output corresponding to the selected range of lines from the graphical representation of lines of the job output; and
displaying errors in the graphical representation of lines of the job output.

20. The computer implemented method of claim 19, wherein displaying the graphical representation of lines of the job output further comprises:
requesting the portion of the job output and then displaying a graphical representation of the portion of the job output when the portion of the job output is received.

21. The computer implemented method of claim 19, wherein the portion of the job output is a plurality of non-contiguous sections in the job output as specified by the user using the set of controls.

22. The computer implemented method of claim 19, further comprising:
responsive to receiving a request for the job output, extracting job output information about the job output for displaying the graphical representation of lines of the job output in the graphical user interface.

23. The computer implemented method of claim 19, further comprising:
extracting information about the job output including file size, error location, and error severity.

* * * * *